United States Patent [19]
Lee et al.

[11] Patent Number: 5,566,018
[45] Date of Patent: Oct. 15, 1996

[54] APPARATUS FOR ADJUSTING CHANNEL WIDTH OF MULTI-CHANNEL FIBER AMPLIFIER LIGHT SOURCE

[75] Inventors: Jae S. Lee; Chang S. Shim, both of Daejeon, Rep. of Korea

[73] Assignees: Electronics and Telecommunications Research Institute, Daejeon; Korea Telecommunication Authority, Seoul, both of Rep. of Korea

[21] Appl. No.: 494,578

[22] Filed: Jun. 26, 1995

[30] Foreign Application Priority Data

Jun. 28, 1994 [KR] Rep. of Korea .................. 94-15000

[51] Int. Cl.$^6$ ................. H01S 3/00; H04B 10/24; H04J 14/02
[52] U.S. Cl. ................. 359/341; 359/114; 359/124
[58] Field of Search ................. 359/341, 114, 359/124, 132

[56] References Cited

U.S. PATENT DOCUMENTS 5,361,161 11/1994 Baney et al. .................. 359/337
5,436,760 7/1995 Nakabayashi .................. 359/341

OTHER PUBLICATIONS

"Spectrum–Sliced Fiber Amplifier Light Source for Multichannel WDM Applications", J. S. Lee, Y. C. Chung & D. J. DiGiovanni, 1993 *IEEE Photonics Technology Letters*, vol. 5, No. 12, Dec. 1993.

*Primary Examiner*—Mark Hellner
*Attorney, Agent, or Firm*—Keck, Mahin & Cate

[57] ABSTRACT

An apparatus for adjusting the channel width of a multichannel fiber amplifier light source, including an erbium-doped optical fiber amplifier constructed to generate a spontaneously emitted, amplified noise beam under a condition that no optical signal is applied thereto, the amplifier being used as a light source for wavelength division multiplexing, namely, a fiber amplifier light source. By the angle-turned Fabry-Perot etalon filter and the fiber-optic beam expander, the channel width can be easily controlled without affecting the free spectral range and the power of output light.

3 Claims, 5 Drawing Sheets

APPARATUS FOR ADJUSTING CHANNEL WIDTH OF MULTI-CHANNEL FIBER AMPLIFIER LIGHT SOURCE

BACKGROUND OF THE INVENTION

1. Field of the Invention

The present invention relates to an apparatus for adjusting the channel width of a multi-channel fiber amplifier light source, and more particularly to an apparatus for adjusting the channel width of a multi-channel fiber amplifier light source for wavelength division multiplexing (WDM), including a Fabry-Perot filter rotatably disposed in a fiber-optic beam expander.

2. Description of the Prior Art

Erbium-doped fibers are generally made by doping erbium that is a kind of rare-earth element in conventional optical fibers made of silica glass.

When signalling beams pass through an erbium-doped fiber together with exciting or pumping beams, the erbium-doped fiber converts energy of the exciting beams with the wavelength of 980 or 1,480 nm into signalling beam energy, thereby amplifying the optical signal.

When only the signalling beams pass through the erbium-doped fiber under a condition that no exciting beam is applied, the erbium is excited by the signalling beams, thereby spontaneously emitting beams. These beams spontaneously emitted is then amplified while travelling along the fiber. Due to such an amplified spontaneous emission (ASE), only noise beams are generated over the wavelength range from 1,530 nm to 1,560 nm and then outputted through the output terminal of the erbium-doped fiber.

Although such noise beams were handled as an unnecessary factor to be removed, there has recently been made a proposal for using them as a broadband WDM light source, namely, a fiber amplifier light source by passing them through an optical filter or optical modulator. This proposal was made by AT & T, U.S.A. in 1993. This method provides an advantage of substituting a plurality of WDM light sources by a single fiber-optic amplifier. It is also possible to easily set the center frequency of each channel meeting the standards by use of an optical filter.

Generally, beams emitted from the above-mentioned light source are irregular in terms of wavelength and phase, as different from those outputted from existing optical communication laser diodes. They have a characteristic similar to that of irregular thermal radiation rays. Such a characteristic results in a poor quality of the light source. In this regard, an improvement in receiving sensitivity may be achieved by increasing the line width of channels as compared to the transfer rate.

However, an excessively increased channel line width results in a distortion of optical pulses due to the color dispersion effect of optical fibers. As a result, there is a restriction on transfer distance.

Furthermore, when ASE components of beams are removed using the optical filter, the efficiency of the exciting beams effecting the power of the signalling beams to be finally used is correspondingly reduced.

SUMMARY OF THE INVENTION

Therefore, an object of the invention is to eliminate the above-mentioned problems and, thus, to provide an apparatus for adjusting the channel width of a multi-channel fiber amplifier light source, including a Fabry-Perot filter rotatably disposed in a fiber-optic beam expander, thereby capable of easily optimizing the channel width and yet keeping the free spectral range nearly constant.

In accordance with the present invention, this object is accomplished by providing an apparatus for adjusting the channel width of a multi-channel fiber amplifier light source, comprising: an exciting beam generator for generating an exciting beam; a first erbium-doped optical fiber for generating a spontaneously emitted, amplified noise light without any input thereto; a fiber-optic beam expander for expanding the light emerging from the first erbium-doped optical fiber through a lens to increase a cross-sectional width of the light, propagating the expanded light to a free space, and then concentrating the resultant light through another lens; a Fabry-Perot filter disposed in the fiber-optic beam expander, the Fabry-Perot filter being adapted to filter spectrums of the spontaneously emitted, amplified light passing through the free space, thereby forming channel width-controllable optical channels for a wavelength division multiplexing; a second erbium-doped optical fiber for amplifying the spontaneously emitted, amplified light having spectrums meeting a wavelength division multiplexing communications, thereby increasing an efficiency of the exciting beam; and a pair of signalling beam/exciting wavelength division multiplexers for mixing the exciting beams supplied from the optical coupler with signalling beams supplied from the first and the second erbium-doped optical fibers respectively, the signalling beams having a different wavelength from that of the exciting beams, so that the resultant beams travel in the corresponding erbium-doped optical fibers respectively.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
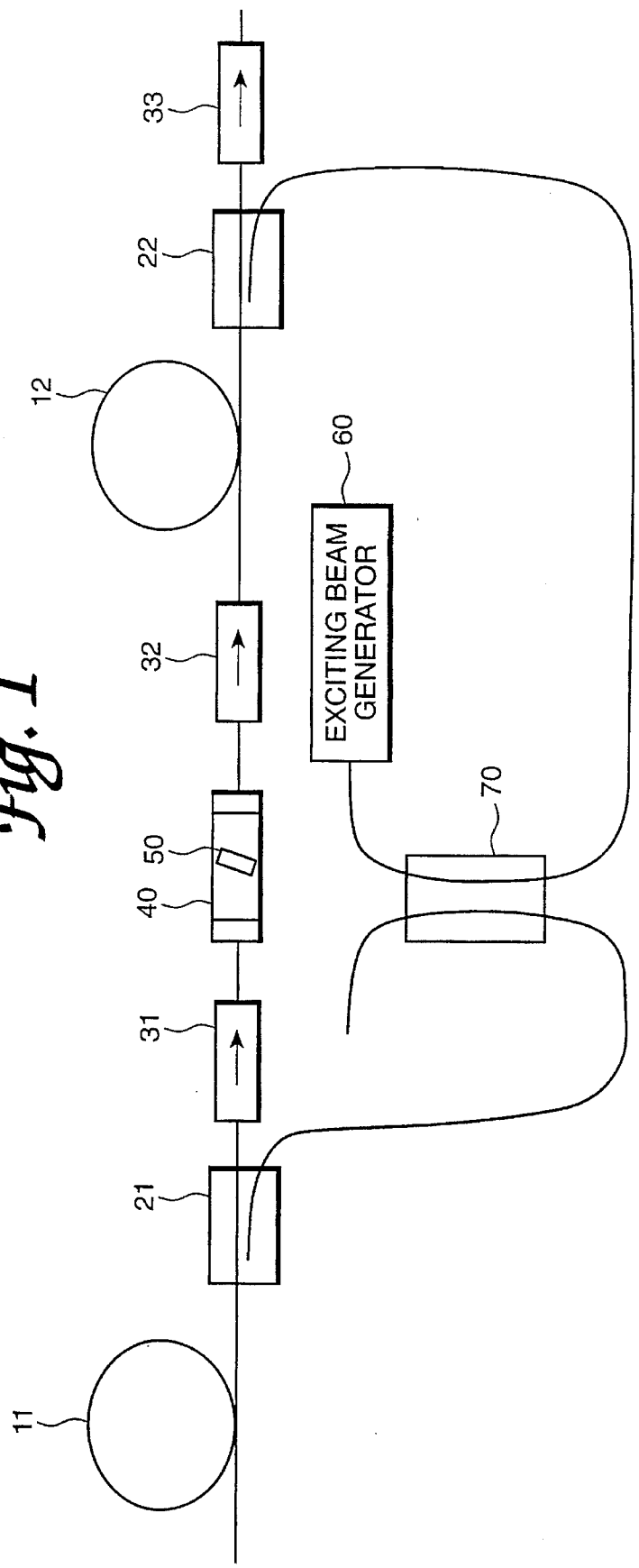
FIG. 1 is a schematic view illustrating an apparatus for adjusting the channel width of a multi-channel fiber amplifier light source in accordance with the present invention.

Referring to FIG. 1, there is illustrated an apparatus for adjusting the channel width of a multi-channel fiber amplifier light source in accordance with the present invention. As shown in FIG. 1, the channel width adjusting apparatus includes an exciting beam generator 60 which is a semiconductor laser being energized by a current injection to generate a pumping or exciting beam with the wavelength of 980 nm or 1480 nm. The exciting beam from the exciting beam generator 60 is sent to an optical coupler 70 which, in turn, divides the received exciting beam into two beams to be applied to a pair of signalling beam/exciting wavelength division multiplexers 21 and 22 via a pair of travel paths, respectively.

To the input of the signalling beam/exciting wavelength division multiplexers 21, a first erbium-doped optical fiber 11 is coupled. The first erbium-doped optical fiber 11 receives no signalling beam so that it generates an ASE noise beam. Together with the exciting beam, the noise beam from the erbium-doped optical fiber 11 is applied to the signalling beam/exciting wavelength division multiplexer 21 so that they are mixed in the signalling beam/exciting wavelength division multiplexer 21. An optical signal resulted from the mixed beams will be sent to another erbium-doped optical fiber.

In the illustrated case, the exciting beam travels in a direction opposite to that of the signalling beam in accordance with the present invention.

The optical signal is applied via a first optical isolator 31 to a fiber-optic beam expander 40. The first optical isolator 31 serves to allow forward travelling optical signals to pass therethrough while preventing backward travelling optical signals from passing therethrough. The beam expander 40 expands the light received therein to a cross-sectional width of about 0.4 mm by a lens, propagates the expanded light to a free space and then concentrates the resultant light on the target optical fiber by another lens.

Beams may escape from the optical fiber. In this case, beams of unnecessary wavelengths are easily removed using an optical filter or the like.

The first optical isolator 31 is a kind of optical rectifier and comprises a Faraday rotator and a polarizer. With such a construction, the first optical isolator 31 forces the signalling beam to travel only in one direction, thereby inhibiting a feedback oscillation occurring in a gain medium by reflected light.

A Fabry-Perot filter 50 is centrally disposed in the fiber-optic beam expander 40 by means of a brass construction such that it rotates easily. The Fabry-Perot filter 50 filters relatively-planar ASE spectrums travelling through the free space at one side of the fiber-optic beam expander 40, thereby forming WDM optical channels with comb-shaped spectrums.

In case of ideal light involving no dispersion, little variation occurs in the transmission characteristic of the Fabry-Perot filter even when the Fabry-Perot filter is at a slightly rotated state. However, light with a finite cross-sectional width involves inevitably a light dispersion causing an increase in cross-sectional width when it is propagated to a free space.

Even in the same incident beam, its ASE components having different incident angles have different peak wavelengths of transmission spectrums, respectively. As a result, overlap of spectrums may be varied depending on the range of incident angles. By such a variation in the overlap of spectrums, the channel width is determined.

Although the dispersion angle obtained by the fiber-optic beam expander used in accordance with the present invention is very small, fox example, about 0.084°, the transmission channel width may vary greatly even at a slightly rotated state of the Fabry-Perot filter. This is because the Fabry-Perot filter has a very sensitive interference characteristic.

When an incident beam is perpendicular to the Fabry-Perot filter, its incident angle is 0°. As the incident angle is increased from 0°, ASE beams having different incident angles exhibit an increased peak wavelength difference of transmission spectrum therebetween. As a result, an increase in channel line width occurs in a region where the incident angle is less than 50° (<50°). Utilizing such a phenomenon, it is possible to easily adjust the output line width of fiber amplifier light sources which utilize the amplified spontaneous emission.

Preferably, the Fabry-Perot filter used in accordance with the present invention comprises a fused-silica glass element having a uniform thickness of, for example, 15 mm and coated with dielectric thin films having a high reflection factor of, for example, 95% respectively at opposite surfaces thereof.

Thus, the ASE beam emerging from the fiber-optic beam expander 40 has spectrums fitting for the WDM communications. The ASE beam from the fiber-optic beam expander 40 is sent to a second optical isolator 32 which, in turn, transmits the ASE beam to a second erbium-doped optical fiber 12. An amplification of the ASE beam is achieved in the second erbium-doped optical fiber 12. Since the second erbium-doped optical fiber 12 exhibits a very high efficiency in the conversion of exciting beams into signalling beams, it is possible to reduce loss of light occurring upon slicing spectrums by the optical filter, as compared to existing methods. The output of the second erbium-doped optical fiber 12 has a substantially constant power maintained at a saturated state because the power of the input light introduced in the second erbiumo-doped optical fiber 12 is high. As a result, it is possible to compensate a great variation in the loss of light occurring at the Fabry-Perot filter 50 depending on the incident angle, thereby stabilizing the power of optical output.

In FIG. 1, the reference numeral 33 denotes a third optical isolator disposed at the side of the output terminal of the apparatus.

Figure 2:
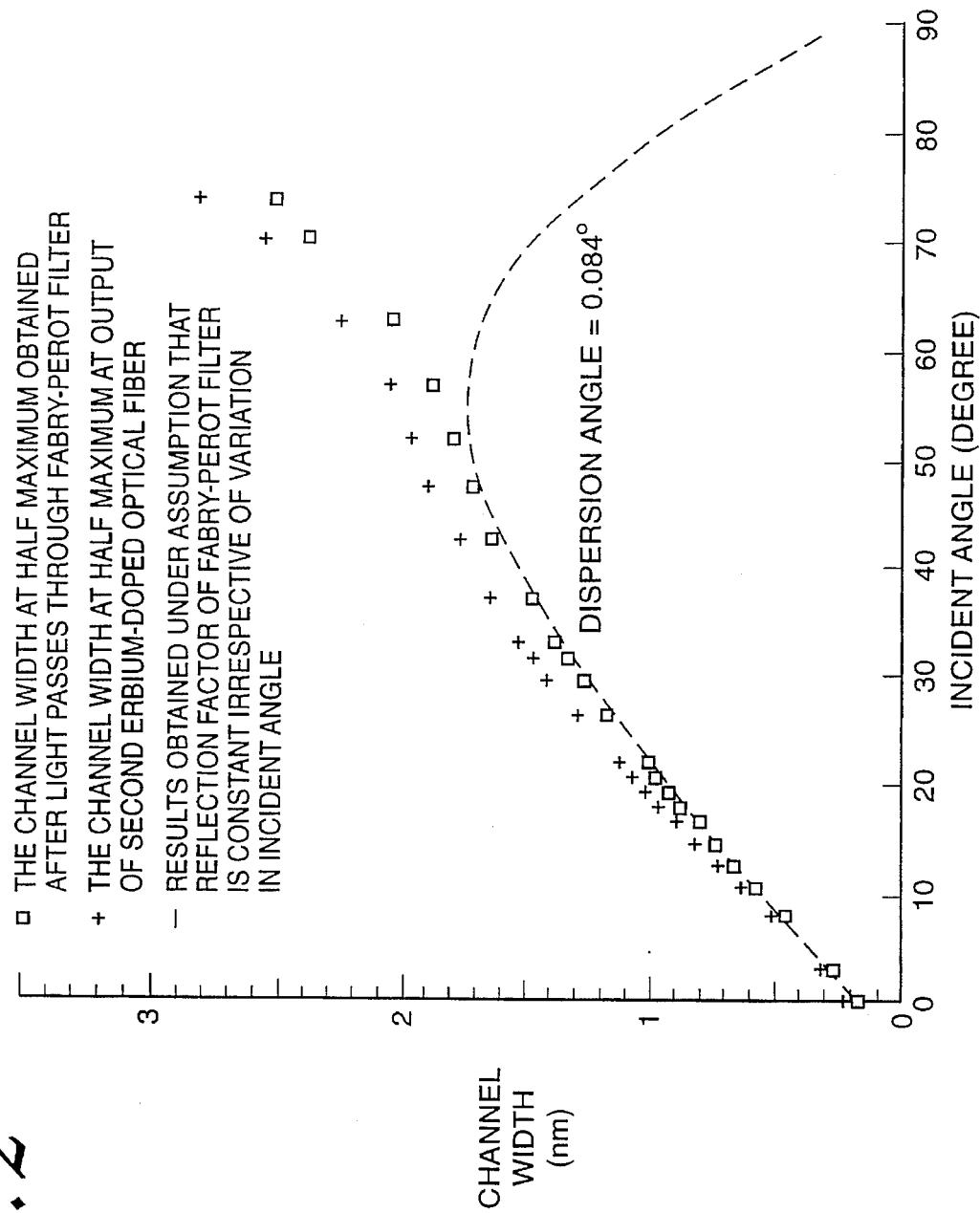
FIG. 2 is a diagram explaining a variation in the channel width depending on the incident angle.

FIG. 2 shows a variation in the channel width depending on the incident angle. Referring to FIG. 2, it can be found that as the incident angle increases, the channel width increases correspondingly. FIG. 2 also shows that the channel width obtained after light passes through the second erbium-doped optical fiber 12 is higher than that obtained before the light passes through the optical fiber 12. Such a variation in channel width across the second erbium-doped optical fiber 12 results from the effect of the amplified spontaneous emission.

In FIG. 2, the dotted line shows the results obtained under an assumption that the reflection factor of the Fabry-Perot filter is constant irrespective of a variation in incident angle. As the incident angle approximates to 90°, the dispersion angle in the Fabry-Perot filter is decreased. In this case, a decrease in channel width is expected. Actually, however, the channel width is rather increased. This is because the reflection factor of the dielectric mirror coated on the Fabry-Perot filter is abruptly decreased as the incident angle approximates to 90°, thereby decreasing the transmission bandwidth of the Fabry-Perot filter.

Figure 3:
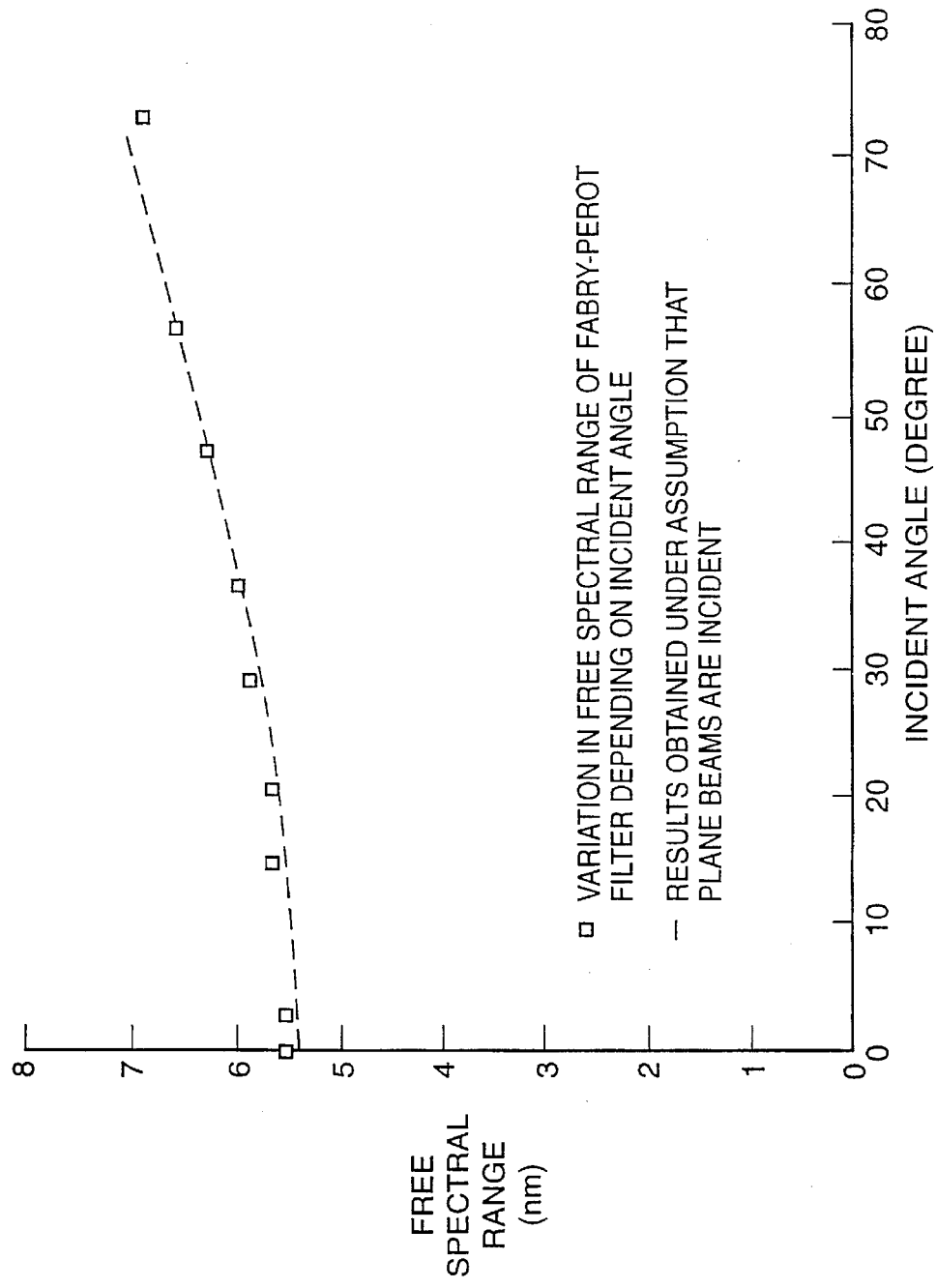
FIG. 3 is a diagram explaining a variation in the free spectral range of a Fabry-Perot filter depending on the incident angle.

FIG. 3 shows a variation in the free spectral range of the Fabry-Perot filter depending on the incident angle. The free spectral range of the Fabry-Perot filter is hardly affected by the dispersion angle. This can be apparent by referring to the theoretical results obtained in case involving no dispersion, as shown in the dotted line in FIG. 3. It, therefore, is possible to adjust the channel width without affecting the free spectral range by appropriately rotating the Fabry-Perot filter in a region where the incident angle is small.

Figure 4:
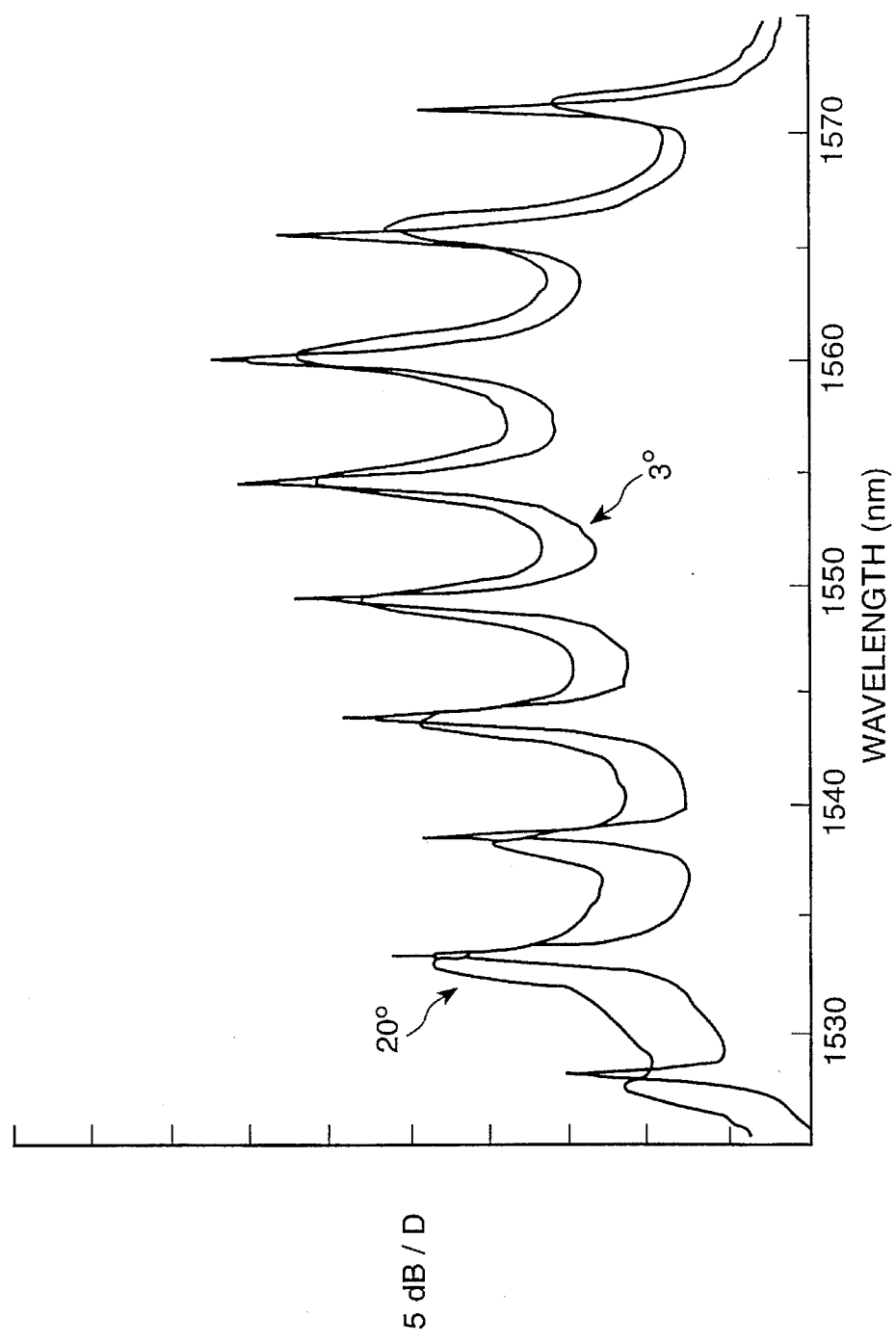
FIG. 4 is a diagram explaining output spectrums from the amplifying light source at different incident angles of 3° and 20°, respectively.

FIG. 4 shows output spectrums from the amplifying light source at different incident angles of 3° and 20°, respectively. By referring to FIG. 4, it can be found that the free spectral range is increased very small from 5.5 nm to 5.6 nm while the channel width is increased three times from 0.3 nm to 1.1 nm.

Figure 5:
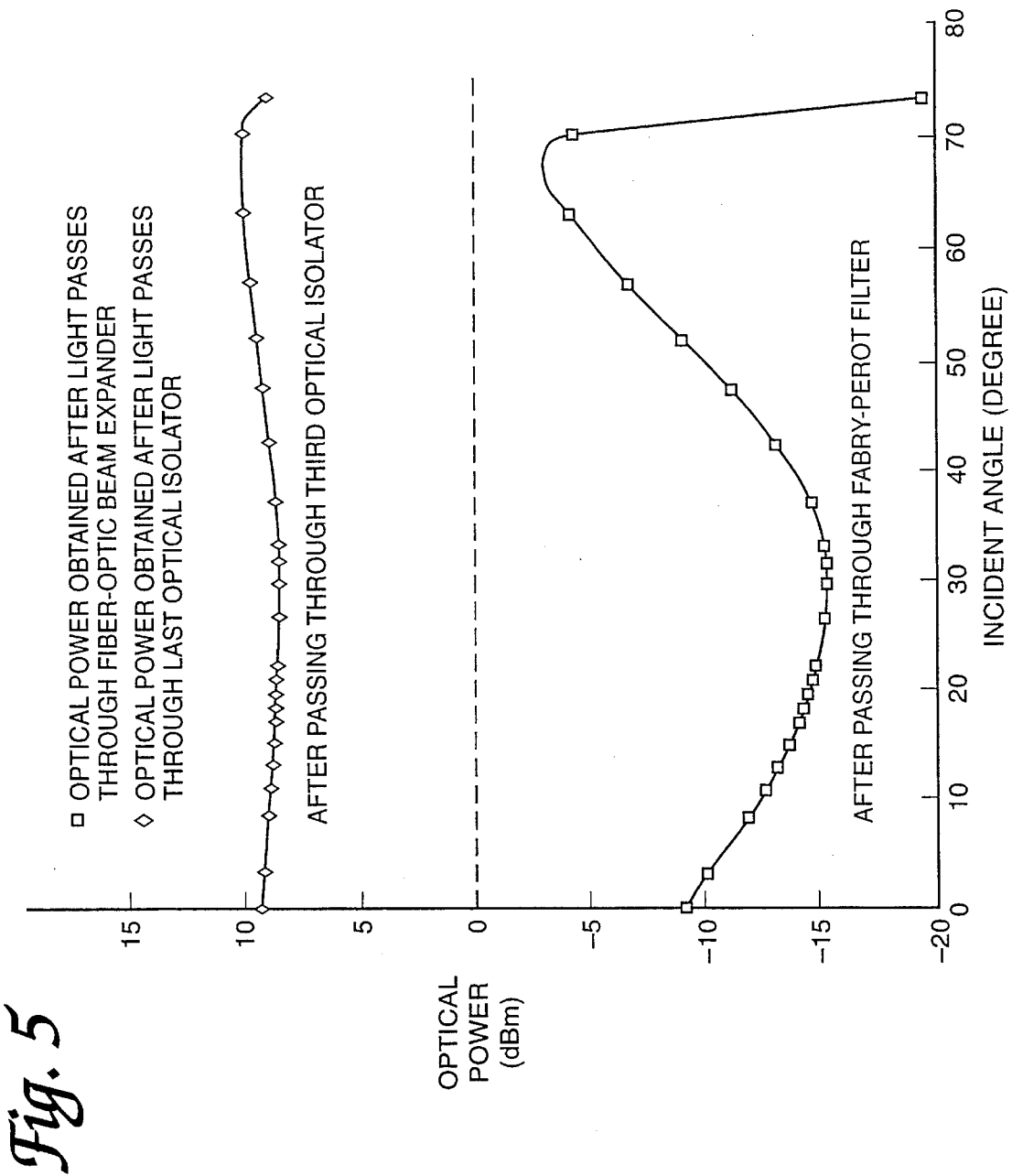
FIG. 5 is a diagram explaining a variation in optical output depending on the incident angle.

FIG. 5 shows a variation in optical output depending on the incident angle. By referring to FIG. 5, it can be found that although the loss of light occurring at the Fabry-Perot filter is greatly varied depending on the incident angle, the power of output light is stably maintained irrespective of the incident angle because the second erbium-doped optical fiber acts in a saturated region.

As apparent from the above description, the present invention provides an apparatus for adjusting the channel width of a multi-channel fiber amplifier light source, including an erbium-doped optical fiber amplifier constructed to generate ASE noise beams under a condition that no optical signal is applied thereto, the amplifier being used as a WDM light source, namely, a fiber amplifier light source. By the Fabry-Perot etalon filter and the fiber-optic beam expander, it is possible to easily control the channel width without affecting the free spectral range and the power of output light. Since a two-stage amplifying light source construction is used in accordance with the present invention, it is also possible to prevent a degradation in the efficiency of exciting beams occurring upon slicing spectrums by the optical filter.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for adjusting the channel width of a multi-channel fiber amplifier light source, comprising:

an exciting beam generator for generating an exciting beam;

a first erbium-doped optical fiber for generating a spontaneously emitted, amplified noise light without input of a signalling beam thereto;

a fiber-optic beam expander for expanding the light emerging from the first erbium-doped optical fiber through a lens to increase a cross-sectional width of the light, propagating the expanded light to a free space, and then concentrating the resultant light through another lens;

a Fabry-Perot filter disposed in the fiber-optic beam expander, the Fabry-Perot filter being adapted to filter spectrums of the spontaneously emitted, amplified light passing through the free space, thereby forming channel width-controllable optical channels for wavelength division multiplexing;

a second erbium-doped optical fiber for re-amplifying the spontaneously emitted, amplified light having spectrums which are fit for wavelength division multiplexing, thereby increasing an efficiency of the exciting beam; and a pair of signalling beam/exciting wavelength division multiplexers for mixing the exciting beams supplied from an optical coupler with signalling beams supplied from the first and the second erbium-doped optical fibers, respectively, the signalling beams having a different wavelength from that of the exciting beams, so that the resultant beams travel in the corresponding erbium-doped optical fibers, respectively.

2. An apparatus in accordance with claim 1, further comprising:

optical isolators respectively disposed between one of the signalling beam/exciting wavelength division multiplexers and the fiber-optic beam expander, between the fiber-optic beam expander and the other signalling beam/exciting and between the second erbium-doped optical fiber and an output terminal of the apparatus, each of the optical isolators being adapted to allow the signalling beams to travel in one direction.

3. An apparatus in accordance with claim 1, further comprising:

an optical coupler for dividing the exciting beam outputted from the exciting beam generator into two beams to travel along different paths, respectively.

* * * * *